(12) United States Patent
Nagaoka et al.

(10) Patent No.: US 7,521,008 B2
(45) Date of Patent: *Apr. 21, 2009

(54) METHOD FOR DESIGNING A RESIN PRODUCT, METHOD FOR PRODUCING A RESIN PRODUCT AND INJECTION MOLDING DEVICE

(75) Inventors: Shinichi Nagaoka, Ichihara (JP); Tomoo Hirota, Ichihara (JP); Yoshiaki Togawa, Kyoto (JP)

(73) Assignee: Sumitomo Chemical Company, Limited, Osaka (JP)

( * ) Notice: Subject to any disclaimer, the term of this patent is extended or adjusted under 35 U.S.C. 154(b) by 583 days.

This patent is subject to a terminal disclaimer.

(21) Appl. No.: 10/812,064

(22) Filed: Mar. 30, 2004

(65) Prior Publication Data

US 2005/0046061 A1  Mar. 3, 2005

(30) Foreign Application Priority Data

Mar. 31, 2003  (JP) .......................... P2003-094453

(51) Int. Cl.
*B29C 45/27* (2006.01)
*B29C 45/76* (2006.01)

(52) U.S. Cl. .................. 264/40.1; 264/328.8; 425/145; 425/573; 700/98; 700/200

(58) Field of Classification Search ................ 264/40.1, 264/40.7, 219, 328.8; 425/145, 163, 572, 425/573; 700/200, 98, 118, 182, 197
See application file for complete search history.

(56) References Cited

U.S. PATENT DOCUMENTS

| 5,812,402 | A | * | 9/1998 | Nishiyama et al. ............ 700/97 |
| 6,096,088 | A | * | 8/2000 | Yu et al. ......................... 703/9 |
| 6,099,767 | A | * | 8/2000 | Tarr et al. .................. 264/40.1 |
| 6,454,973 | B1 | * | 9/2002 | Norton ....................... 264/40.1 |
| 6,558,605 | B1 | * | 5/2003 | Wilson .................... 264/328.8 |
| 6,816,820 | B1 | * | 11/2004 | Friedl et al. .................... 703/2 |
| 2003/0149498 | A1 | * | 8/2003 | Rebello et al. ................ 700/97 |

(Continued)

FOREIGN PATENT DOCUMENTS

JP  2002-355866 A  12/2002

(Continued)

OTHER PUBLICATIONS

Nagaoka et al., "Application of CAO Technique to Injection Molding Analysis", V-212, Jun. 13, 2003, with English Abstract.

(Continued)

*Primary Examiner*—Jill L Heitbrink
(74) *Attorney, Agent, or Firm*—Sughrue Mion, PLLC

(57) ABSTRACT

The object of the present invention is to realize an optimum resin product design even in the event of conducting injection molding of an arbitrary shape resin product, taking into account of the mold clamping force required for molding and the capacity of an available injection molding device. When a resin product to be molded by injection molding is designed, the mold clamping force required for injection molding of the resin product having a specified shape is determined using a computer-aided optimization method and then the design of the resin product is determined based on the thus obtained mold clamping force.

10 Claims, 9 Drawing Sheets

U.S. PATENT DOCUMENTS

2004/0047935 A1* 3/2004 Moss et al. ............. 425/145

FOREIGN PATENT DOCUMENTS

WO    WO 02/100623 A1    12/2002

OTHER PUBLICATIONS

Nagaoka et al., "Application of CAO Technique to Injection Molding Analysis", C217, Nov. 4, 2003, with English Abstract.

Nagaoka et al., "New Method of Designing Runner System for Injection Mold Using CAO Technique", ANTEC 2004.

* cited by examiner

GATE OPERATION (CASE 2)

METHOD FOR DESIGNING A RESIN PRODUCT, METHOD FOR PRODUCING A RESIN PRODUCT AND INJECTION MOLDING DEVICE

BACKGROUND OF THE INVENTION

1. Field of the Invention

The present invention relates to a method for designing, a method for producing and an injection molding device, for a resin product molded by injection molding.

2. Related Background Art

When molding resin using an injection molding device, it is necessary to determine the resin for use, the molding temperature, the injection speed, and others so that the mold clamping force required for molding does not exceed the capacity of the device. Normally the predetermined mold clamping force of a device is not the minimum necessary force for molding but a value including safety factor allowance is used. The mold clamping force is expressed by [(the resin pressure in the cavity)×(the projected area)]. For example, Japanese Patent Laid-open Gazette No. 2002-355866, page 2 discloses a technology to reduce the mold clamping force.

Above-mentioned Gazette discloses a technology, in the case where the product shape extends in a longitudinal direction, that a plurality of gates through which the molten resin is injected into the cavity are arranged along the direction from the resin filling starting side to the filling completion side, and the molten resin is sequentially injected into the cavity at a specified interval starting with injection at the filling starting gate. According to the technology, the resin injected in early stage comes to an almost cooled and solidified state when reached the final filling stage. As a result, the substantial projected area which should be filled with the molten resin injected from the final gate is significantly reduced compared with the total projected area of the cavity.

SUMMARY OF THE INVENTION

Although a longitudinally extending shape molding allows easy judgment on timing determination of injection time-intervals, it is difficult to apply the technology to the moldings having general shapes. Therefore, it was necessary to repeat trial and error manually trusting intuition or experience to judge the timing of injection start, reduction of inflow or injection stop from a gate. Consequently, it was difficult to attain optimum design of a resin product respecting the mold clamping force required for molding the resin product by the method described in the aforementioned patent disclosure.

Responding to the above-described issues, an object of the present invention is to provide a design method, a production method and an injection molding device for a resin product which are able to realize the optimum resin product design considering the mold clamping force required for molding and the capacity of an available injection molding device even for the resin product having an arbitrary shape.

The present invention has been completed to attain the aforementioned object, and provides a method for designing a resin product in the event of designing a resin product molded by injection molding, the method having the steps of: obtaining a mold clamping force required for injection molding of the resin product having a specified shape using a computer-aided optimization method; and determining the design of the resin product based on the thus obtained mold clamping force. This method makes it possible to attain the best design considering the capacity restriction of the available injection molding device. Injection molding refers to a wide and general injection molding, including for example, injection-press molding, injection-compression molding, and foam-injection molding.

The resin product having a specified shape refers to a resin product having versatility within the range of preliminary design established under restrictions on the product regarding its shape and dimensions. For example, this category includes such a resin product that has versatility left in thickness or the selection of material with the restriction regarding the shape and diminsions given two-dimensionally in advance from the usage of the product.

In this invention, one or more additives which are usually used may be added to the resin component provided that it does not interfere with the purpose of the invention. The additives include fibrous reinforcing materials such as glass fiber, silica alumina fiber, alumina fiber, carbon fiber, organic fiber derived from such plants as hemp and kenaf, and synthetic fiber; acicular reinforcing materials such as aluminum borate whisker and potassium titanate whisker; inorganic fillers such as glass beads, talc, mica, graphite, wollastonite and dolomite; mold-release enhancers such as fluororesins and metal soaps; coloring agents such as dyes and pigments; antioxidants; heat stabilizers; ultraviolet light absorbers; antistatic agents; and surfactants.

The resin preferably used in this invention is the thermoplastic resin. The thermoplastic resin may be any of those substances generally referred to as thermoplastic resins, e.g., amorphous polymers, semi-crystalline polymers, crystalline polymers and liquid crystal polymers. The thermoplastic resin may be of one type, or a blend of plural polymer components. Specifically, the thermoplastic resin may be an olefin resin such as low density polyethylene, high density polyethylene, propylene resin and ethylene propylene copolymer; styrene resin such as polystyrene, high impact polystyrene and ABS resin; an acrylic resin such as polymethyl methacrylate; polyester resin such as polyethylene terephthalate and polybutylene terephthalate; polycarbonate resin such as polycarbonate and modified polycarbonate; polyamide resin such as polyamide 66, polyamide 6 and polyamide 46; polyacetal resin such as polyoxymethylene copolymer and polyoxymethylene homopolymer; engineering plastics and super engineering plastics such as polyether sulfone, polyether imide, thermoplastic polyimide, polyether ketone, polyether ether ketone and polyphenylene sulfide; cellulose derivatives such as cellulose acetate, cellulose acetate butyrate and ethyl cellulose; liquid crystal type polymer such as liquid crystal polymer and liquid crystal aromatic polyester; and thermoplastic elastomer such as thermoplastic polyurethane elastomer, thermoplastic styrene butadiene elastomer, thermoplastic polyolefin elastomer, thermoplastic polyester elastomer, thermoplastic vinyl chloride elastomer and thermoplastic polyamide elastomer.

Another suitable resin material is, for example, a low flow polypropylene resin used in automotive parts. The fluidity of the resin is expressed by Melt Flow Rate (MFR, unit: g/10 min) measured by the method described in JIS-K7210. In the context of this application, a low flow resin is a resin which, when measured by the aforesaid method at a temperature of 230° C. and under a load of 2.16 kg, has a value of 0.5-20, preferably 1.0-10. Among common polypropylene thermoplastic resins, materials having excellent impact strength tend to have a low fluidity when melted, and to improve product impact resistance, a resin having the lowest possible fluidity is preferably selected. As for resins having a MFR value of less than 0.5, the fluidity is too low and molding by the injection molding technique is considered impractical. On the other hand, if the MFR value exceeds 20, it is unlikely that the mold clamping force required for molding will be excessive.

When above-described low fluidity resin is molded under conditions for high fluidity resin, the required mold clamping force becomes enormous exceeding the capacity of mold clamping force of the molding device. Accordingly, low fluidity resin cannot be selected as the material at the stage of product design when the capacity of injection molding device is fixed. Nevertheless, the mold clamping force required for injection molding is reduced, determining by means of a computer-aided optimization method, which widens the selection range of the resin materials. As a result, the thickness of the product to attain the same impact strength can be reduced.

As a variable parameter for determining the mold clamping force, for example, the process parameter which determines the inflow of resin material through the resin inflow conduit, can be introduced. Determining the process parameter using the computer-aided optimization method enables us to calculate accurate parameters promptly without repeating trial and error manually.

A preferable parameter, as said process parameter, is the one to control the operation of inflow regulation valves positioned in a plurality of resin inflow conduits. Other flow rate regulation means such as a means to regulate the total inflow to the mold may be applied independently or together with the parameter for controlling the regulation valve. Various kinds of resin are applicable as the resin material for molding depending on the target product and manufacturing conditions, and thermoplastic resin is preferred. For the case of thermoplastic resin, flow rate regulation can be easy when adopting a hot runner having a heat-retaining means in the resin inflow conduit. The inflow regulation valve may be configured as what is called the valve gate.

The control method of the action of an inflow regulation valve may be variable flow rate control. In actual application, however, the operation of either full opening or full closing is sufficient. As a practical constraint condition, it is preferable to optimize the process parameter under the condition that at least one valve gate is kept opened at any spot of time during the filling stage. For efficient work for optimization, if an inflow regulation valve is disposed at each of the plurality of resin inflow conduit, one valve gate may be selected as a timing regulation gate, while action settings of other valve gates are arbitrarily arranged, and said timing regulation gate may be controlled so that at least one valve gate is kept opened at any spot of timing during filling stage.

A variable parameter for determining the mold clamping force using the optimization method may be a product design parameter concerning with the range of preliminary design (for example, material and thickness distribution) established under the restrictions on a resin product regarding its shape and dimensions. For instance, in case the product has a plurality of thickness distribution patterns predetermined, the optimization method is used to check the reduction in mold clamping force for each pattern, thus a particular thickness distribution pattern can be selected among said plurality of thickness distribution patterns. In addition it is possible to investigate how far the thickness can be reduced under the restriction on mold clamping force through adopting the product thickness distributions as a variable parameter. In another aspect according to the present invention, injection molding under the optimized condition (within a range of required mold clamping force) can mold a resin product which is designed by the above-described method for designing a resin product.

A further aspect of the present invention is an injection molding device having: a molding device main body which feeds a molten resin to a mold having a plurality of resin inflow conduits to a cavity through the resin inflow conduits; a memory section which memorizes molding parameters determined by a computer-aided optimization method; and a control section which conducts injection molding while controlling the molding device main body based on the molding parameter for the mold clamping force predetermined.

DESCRIPTION OF THE PREFERRED EMBODIMENTS

Figure 1:
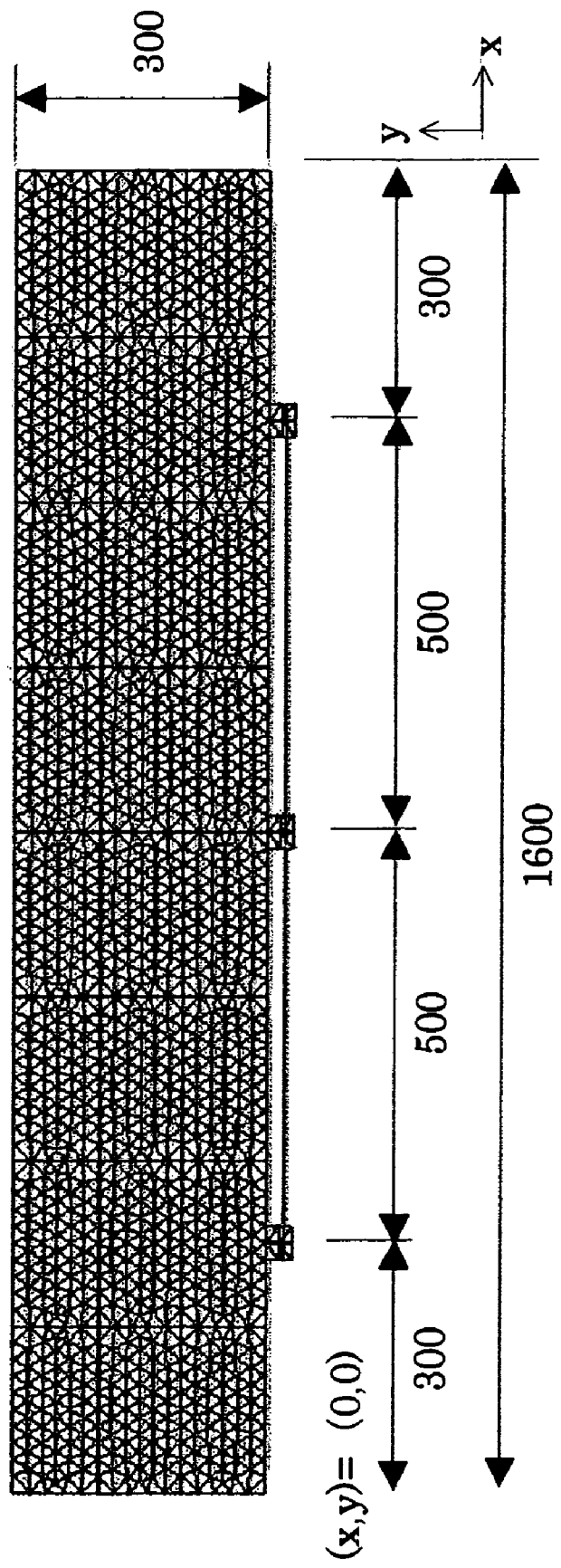
FIG. 1 shows a cavity for molding and the location of gates to explain an embodiment according to the present invention.
Figure 2:
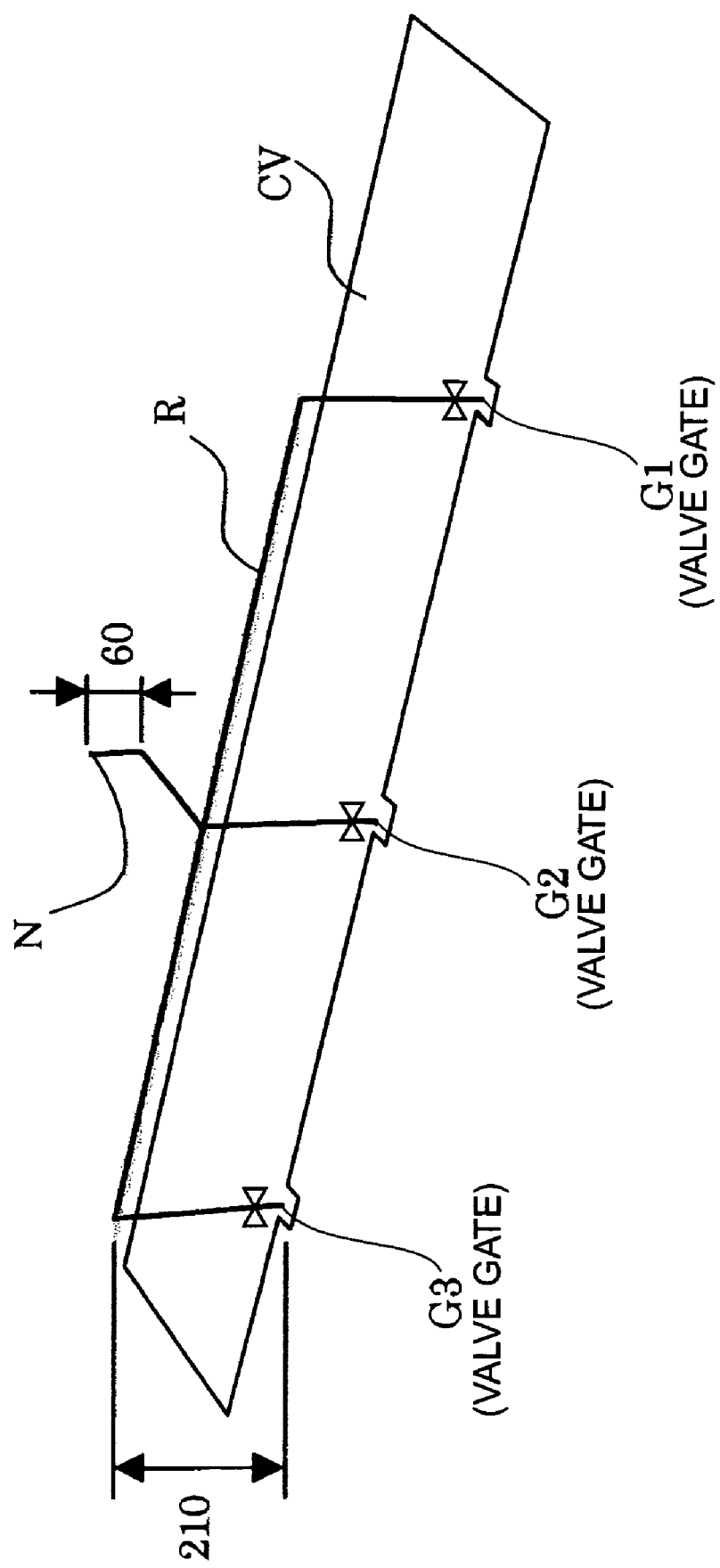
FIG. 2 shows a cavity for molding and a resin inflow conduit to explain one embodiment according to the present invention.

Preferred embodiments of the present invention are described in detail bellow referring to the drawings. The embodiment illustrates a design method of a case of manufacturing a plate-shaped member extending in one direction, (a length-to-width ratio=16/3), as shown in FIG. 1, by injection molding using a predetermined resin material. As depicted in FIG. 2, a cavity CV has three gates (G1, G2, and G3) at the center, the right, and the left on one side of the plate. According to the present invention, the number of gates is required only to be two or more and may be adequately determined depending on the shape and dimensions of a resin product.

Firstly, preliminary designs (1) through (3) were prepared which were united with respect to two-dimensional shape and dimensions, while being varied in resin material and plate thickness. The dimensions were 1600 mm in width, 300 mm in length, and 3 mm and 2.5 mm in thickness. The melt flow rate (MFR: unit g/10 min) was measured at a temperature of 230° C. and a load of 2.16 kg according to the method specified in JIS-K7210.

TABLE 1

| | Material | Plate thickness | Remarks |
|---|---|---|---|
| (1) | AZ564 (MFR = 30) | 3.0 mm | High flow resin |
| (2) | AH561 (MFR = 3) | 3.0 mm | Low flow resin |
| (3) | AH561 (MFR = 3) | 2.5 mm | Low flow resin |

The embodiment describes the case in which at least one gate is a valve gate which can be opened and closed through the movement of a valve, and injection molding is conducted so that the minimum mold clamping force is achieved by controlling the opening degree of the valve gate. When at least one of the three gates G1, G2, and G3 shown in FIG. 2 is determined to be kept fully opened or fully closed as the result of the optimization described later, there is no necessity for it to be a valve gate in an actual mold. Each of gates G1, G2, and G3 connects with the front end of a nozzle N via a runner R. The runner R is designed to be a so-called hot runner which is controlled to maintain a specified temperature to prevent the resin in the runner R from solidification.

Figure 9:
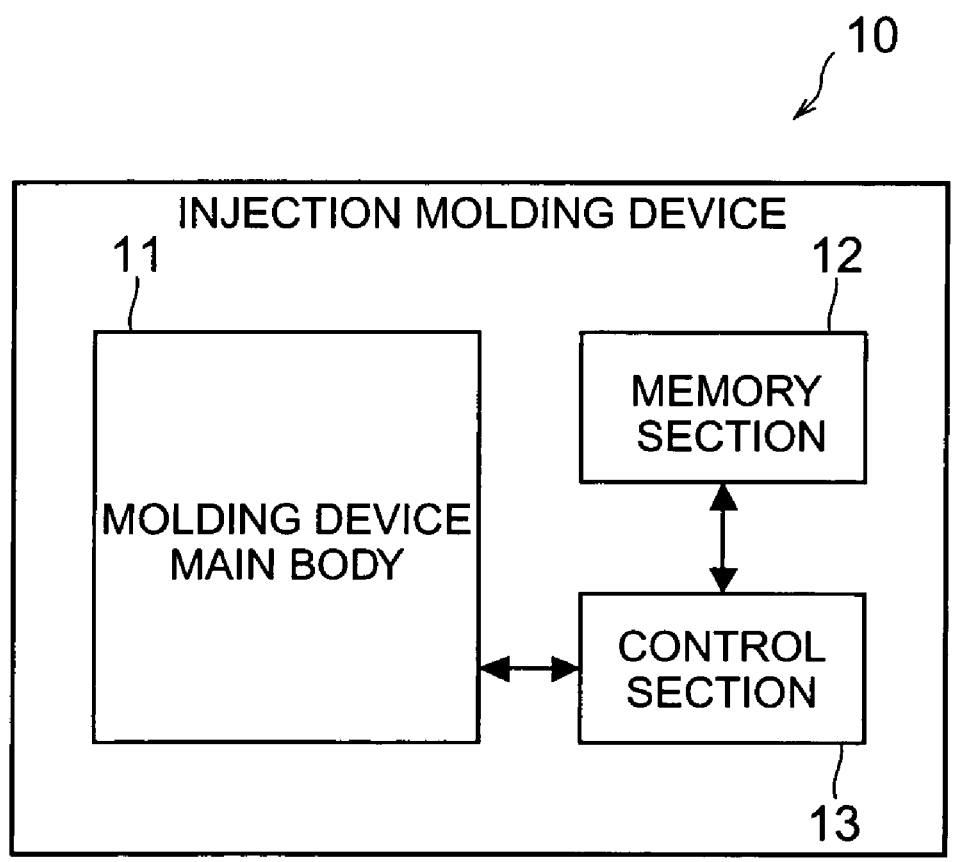
FIG. 9 shows one exemplary configuration of the injection molding device according to the present invention.

FIG. 9 shows an example of the configuration of an injection molding device according to the embodiment. As shown in FIG. 9, the injection molding device 10 comprises: a molding device main body 11 which feeds molten resin from the nozzle N shown in FIG. 2; a memory section 12 which memorizes molding conditions (molding parameters) determined by the computer-aided optimization method; and a control section 13 which conducts injection molding while controlling the molding device main body 11 on the basis of the thus determined molding conditions (molding parameters) corresponding to the determined mold clamping force.

Figure 3:
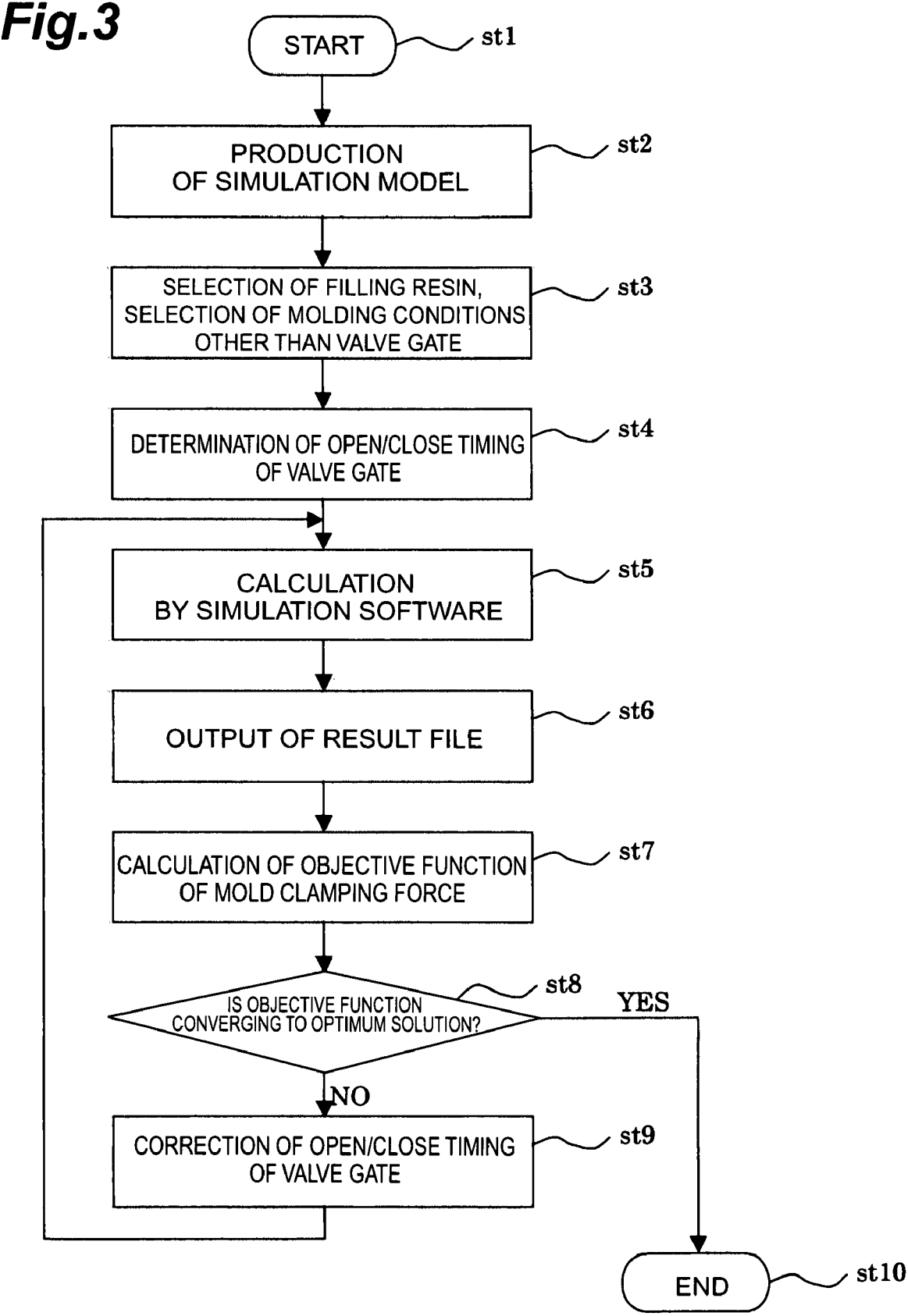
FIG. 3 shows a flow diagram to explain one embodiment of the method for determining the process parameter of an injection molding according to the present invention.

According to the embodiment, for the preliminary designs (2) and (3), a case where the minimum required mold clamping force is achieved is determined by use of the combination of the numerical analysis method for calculating the injection molding process and the computer-aided optimization method, the combination using the open/close timing of each valve gate as variables. Also for the preliminary designs (1) and (2), the clamping force required under the condition that all gates are always kept opened was calculated with varied temperature conditions. Regarding the numerical analysis method to calculate the injection molding process, the method in which the behavior of resin is analyzed based on the finite element method using a calculation equations on the basis of the relationship working between elements during molding, has been brought into practical application in recent years. The embodiment adopts Moldflow Plastics Insight 2.0 rev1 (trade name, produced by Moldflow Corporation). Many similar computer-aided optimization methods have been developed. The embodiment adopted iSIGHT 6.0 (trade name, produced by Engineous Software Inc.) as software. Since the analysis deals with a problem with intense nonlinearity, SA (simulated annealing) was adopted, which could explore the design space in global basis and was appreciated, therefore, as an easy-attainable global optimum, without a risk of ending in local optimum. The total flow scheme of the analysis is described below referring to the flow diagram of FIG. 3.

(1) Preparation of Simulation Model

Firstly, in Step 2, the simulation model for analyzing the resin flow during the injection molding process is produced. In the embodiment, a wide and flat plate model specified below is used.

Dimensions: 1600 mm in width, 300 mm in length, and 3 mm and 2.5 mm in thickness, respectively.

Number of elements: 2862, Number of nodes: 1558, Three gates on one side

Runner diameter: 6 mm φ (Hot runner)

Gate: 4 mmφ×7.5 mm L (Valve gate)

(2) Determination of Molding Condition

It is necessary to enter data such as physical properties of the resin selected as the material. The resins applied are Sumitomo Noblen AH561 and AZ564, (trade name; produced by Sumitomo Chemical Co. Ltd.; MFR=3 for AH561 and MFR=30 for AZ564). The physical properties to be entered include thermal conductivity, specific heat, no-flow temperature, and viscosity. For other molding conditions, resin temperature, hot runner temperature, and mold temperature were set to 220° C., 220° C., and 50° C., respectively, the injection rate was set to be constant rate, and the injection time was set about 6 seconds.

(3) Computer-Aided Optimization Stage

In Step 4, the initial value of the required parameter, (also called variable parameter; the open/close timing of the valve gate in this case), is determined. In Step 5, the resin injection process is calculated. In Step 6, the result file is output. In Step 7, the mold clamping force as the objective function is calculated based on the result file. In Step 8, whether the calculated value is converging to an optimum solution, is evaluated. If not, in Step 9 the design variable is corrected based on the algorithm of the optimization method and Step 5 through Step 9 are repeated. If Step 8 determines that the objective function converges to the optimum solution, the optimization stage is completed.

Simulated annealing is adopted in the embodiment as the algorithm of the optimization method. In metal annealing, slow cooling of metals settles the individual molecules energy in a high level to a low level. The simulated annealing adopts this as a model. That is, the simulated annealing is not a method to explore the optimum solution quickly but a method allowing global exploration by generating a variety of solutions while allowing local degradation of solution. The convergence to the optimum solution is to be judged after specified iterations of calculations.

(4) Impartation of Constraint Conditions on Determining Open/Close Timing

The embodiment adopts three valve gates. The open/close timing may be assumed to establish independently for each individual valve gates. In some cases, however, these valve gates cannot be manipulated independently because of the limitations in actual operation. It is efficient to conduct the optimization under further restricted conditions to exclude that type of unnecessary solution in advance. To this point, the following constraint conditions were established.

Firstly, in this embodiment, the opening degree of each valve gate is not regulated continuously or stepwise, but only two positions of open and close are adopted considering the practical applicability. Here, the applicable action patterns of each valve gate during the injection molding process are considered. Since the resin does not solidify in the hot runner, each valve gate can wait in a closed state even after the start of the injection molding, and can begin an opening action at any time afterwards. Also, a valve gate which was opened once to allow resin to pass through can be closed. If, however, a valve gate which was once opened followed by closing is again opened, the resin in the downstream side of the valve gate may solidify, depending on the period of a closed state, and the product may have molding defects such as deterioration in appearance. Consequently, the operation pattern of [open→close→open] was not adopted. As a result, possible operation patterns for a single valve gate are five in all: (1) always open, (2) always close, (3) close→open, (4)

open→close, and (5) close→open→close. This variation was defined as a first constraint condition.

On actual molding, when all the gates are simultaneously closed, runners and valve gates should be subjected to abnormally high pressure, and analysis likely induces error owing to the nature of software. For the countermeasures against this in the embodiment, it was established as a second condition that at least one gate is kept opened during the molding process.

With the combination of the first and second conditions, the following constraint condition for the action of valve gates is derived. That is, two of the three valve gates can be arbitrarily operated within the five patterns of the first condition. However, at the timing that the two valve gates are closed, the third valve gate must be opened. Hereinafter a valve gate which can be arbitrarily manipulated is called an arbitrary control gate, and a gate which is restricted by the action of other gates is called a regulation gate. A method to vary the variable parameter under condition where a valve gate is selected as the regulation gate is described below.

(5) Case Selection on Determining Open/Close Timing

For example, among the valve gates A, B, and C, when the valve gates A and B are selected as arbitrary control gates and the valve gate C is selected as a regulation gate, the process to determine the timing of each valve gate as the variable is described below specifically.

Figure 4:
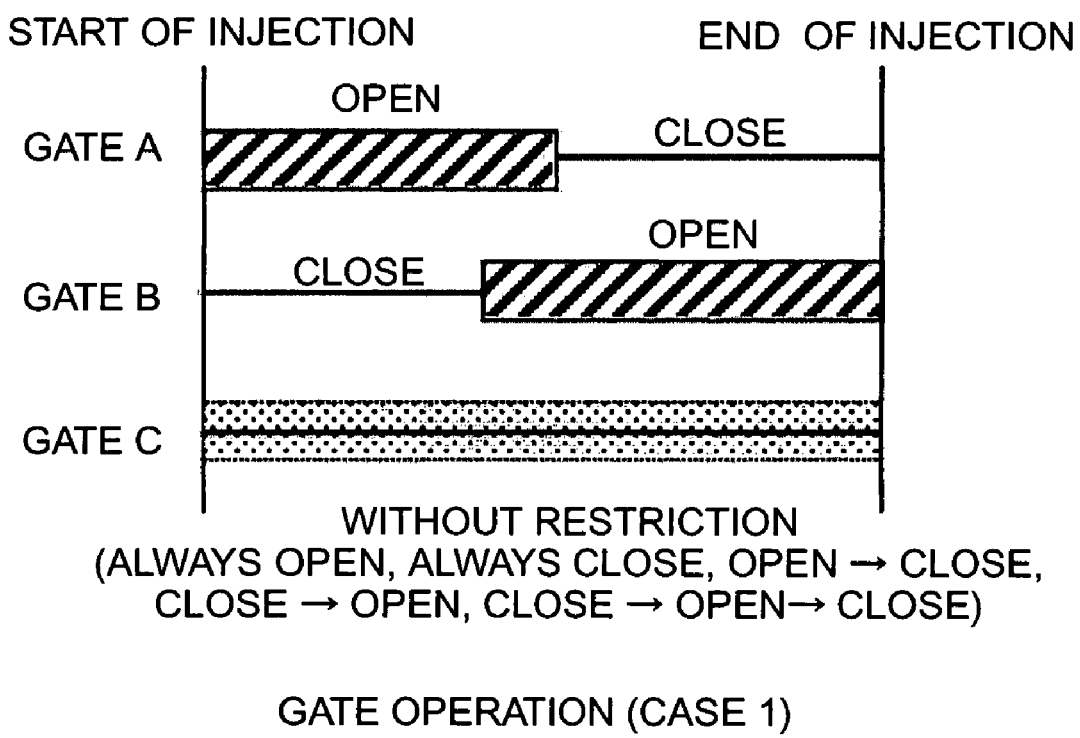
FIG. 4 shows one exemplary gate operation pattern in one embodiment of the method for determining the process parameter of an injection molding according to the present invention.
Figure 5:
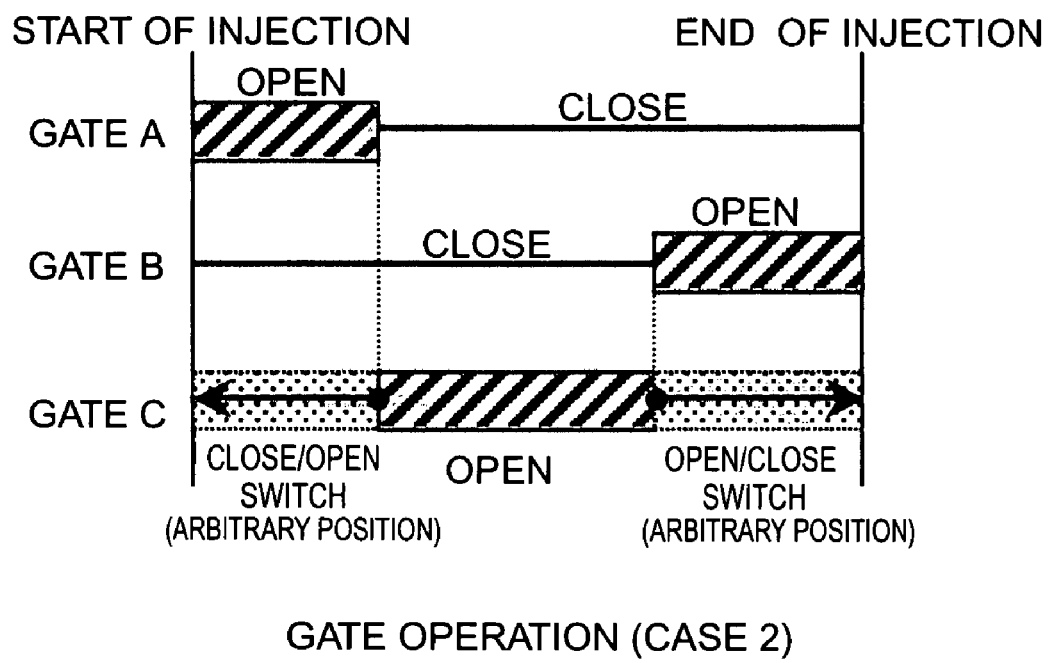
FIG. 5 shows another exemplary gate operation pattern in one embodiment of the method for determining the process parameter of an injection molding according to the present invention.
Figure 6:
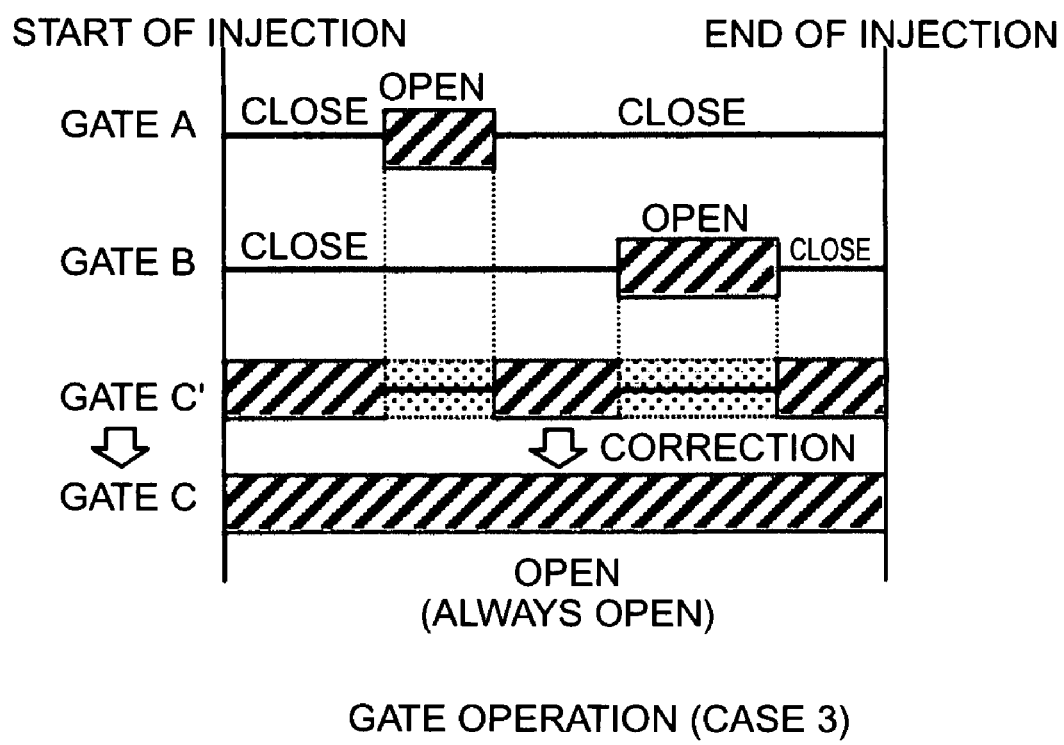
FIG. 6 shows a further exemplary gate operation pattern in one embodiment of the method for determining the process parameter of an injection molding according to the present invention.

1) For the arbitrary control gates A and B, the open/close timing is arbitrarily determined under the first condition.
2) Regarding the open/close timing determined for the gates A and B, the open periods of the gates included in the period from the start of injection to the end of the injection are superimposed with each other and the presence of a timing when both gates are closed is judged.
3) If there is not any timing where both gate A and gate B are closed at the same time, the open/close timing for the regulation gate C may be selected arbitrarily without constraint conditions (Refer to the Case 1 of FIG. 4).
4) If there is a timing where both the gate A and gate B are closed at the same time, the gate C is to be kept opened in that particular timing. If there is a plurality of open timings, the close timing sandwiched between the open timings is changed to an open timing to be kept opened so as to satisfy the first condition (not adopting the [open→close→open] pattern). In this case, the open/close timing of gate C is allowed only to vary in such a manner that the above-described open timing is extended backward or forward (Refer to the Case 2 of FIG. 5). For the Case 3 of FIG. 6, since gate A and gate B are closed at the same time in the initial stage and the final stage of molding, gate C must be opened in the initial stage and the final stage of molding. On the other hand, since the first condition does not allow the [open→close→open] pattern, gate C is always open.

As the conclusion, when gate C is selected as the regulation gate, the open/close timing of gate A and gate B may be arbitrarily selected under the first condition. Gate C, however, may freely select the open/close timing as in the Case 1, or may be restricted to be kept opened in a specific period as in the Case 2 or to be kept opened in the whole period as in the Case 3. According to this embodiment, in the Step 4 or Step 9, the gate control program determines the above-described case selection, then the optimization support software selects the open/close timing of the valve gates as a variable parameter within the range of the respective constraint conditions and conducts optimization. Even when one gate is selected as the regulation gate C and failed to judge, similar works conducted by selecting an other gate as the regulation gate may increase the analytical accuracy in some cases. The selection of the regulation gate need not be done duplicately for equivalent gates. For example, as shown in FIG. 2, for the case in which the valve gates G1 and G3 are symmetrically positioned to have no difference in terms of injection molding condition, only one of them may be selected as the regulation gate. Although this embodiment describes an example of the case of three valve gates, the cases of four or more valve gates are similar.

(6) Determination of Open/Close Timing as a Variable Parameter

With the presumption of case selection described above, methods to determine the open/close timing as the variable parameters are described in more detail. Variable parameters are determined as follows, and the description is given referring to these.

Open timing of gate A through gate C (in seconds) . . . $ta1$, $tb1$, $tc1$

Sustained open time of gates A through gate C (in seconds) . . . $dta$, $dtb$, $dtc$ Coefficient of variation of open timing of gate C . . . $\alpha$ Coefficient of variation of close timing of gate C . . . $\beta$ It should be noted that $ta1$, $tb1$, and $tc1$ are zero at the start of injection.

Figure 7:
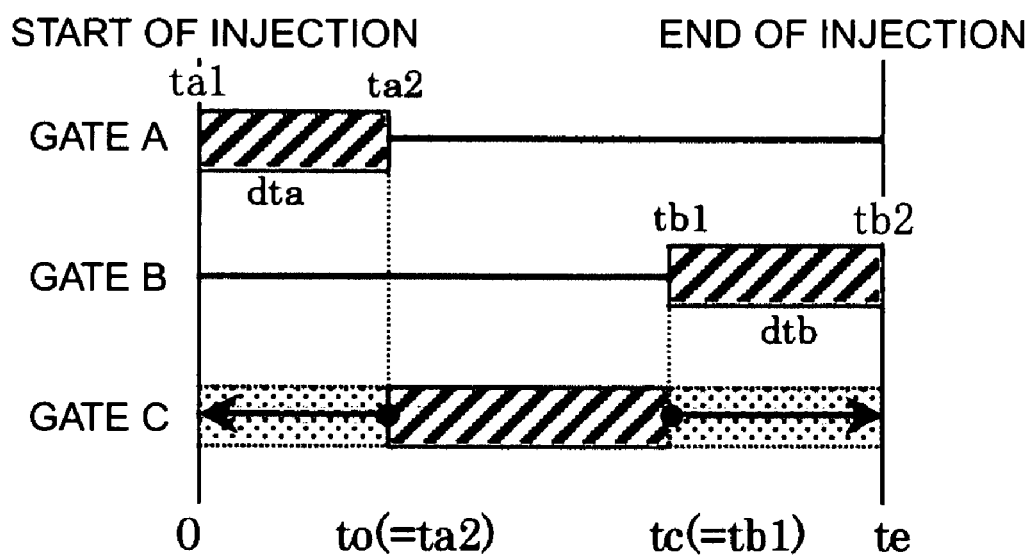
FIG. 7 shows a still another exemplary gate operation pattern in one embodiment of the method for determining the process parameter of an injection molding according to the present invention.

Firstly, gate C is selected as the regulation gate. Then, the gate control program is applied to determine independent variables of open timing $ta1$ and $tb1$, and sustained open time $dta$ and $dtb$ for arbitrary control gates A and B, thus conducting the above-described case selection. For the Case 1, the open/close timing of the gate C is also independently determined, therefore all the $ta1$, $tb1$, $tc1$, and $dta$, $dtb$, $dtc$ are used as the independent variables. For the Case 2, the critical values of the open/close timing of the gate C, to and tc (the minimum values to satisfy the constraint condition), are calculated from the values of $ta1$, $tb1$, $dta$, and $dtb$, as shown in FIG. 7. If the case that the range of open is extended backward and forward is considered, the open and close timings of the gate C, tco and tcc, are determined, respectively, as $$tco = to \times \alpha$$

$$tcc = tc + (te - tc) \times \beta$$

where, te is the time of injection completion. $\alpha$ and $\beta$ are arbitrary values satisfying $0 \leq \alpha \leq 1$ and $0 \leq \beta < 1$, respectively. By varying these values, the open/close timing of the gate C can be arbitrarily changed. As for the variable parameters in the embodiment, the initial conditions determined in Step 4 and the constraint conditions applied in Step 9 are as follows (1) Constraint Condition $$0 \leq ta1 \leq 6, 0 \leq tb1 \leq 6, 0 \leq tc1 \leq 6, 0 \leq dta \leq 6, 0 \leq dtb \leq 6, 0 \leq dtc \leq 6$$

$$0 \leq \alpha \leq 1, 0 \leq \beta \leq 1$$

According to the calculation, the injection time completes in slightly less than about 6 seconds (variable with conditions) so that the upper limit for each of $ta1$, $tb1$, $tc1$, $dta$, $dtb$ and $dtc$, is selected as 6 (seconds).

(2) Initial Condition $$ta1 = tb1 = tc1 = 0, dta = 6, dtb = dtc = 0, \alpha = \beta = 0.5$$

(7) Objective Function

The maximum mold clamping force is calculated as the objective function. The mold clamping force is derived by calculating the resin pressure in the cavity using simulation software, then by multiplying the internal pressure by the projected area.

(8) Calculation Example of Optimizing Open/Close Timing

The result of calculation for optimization using the above-described simulation model is given in (2)-2 and (3) in Table 2. The conditions (1) and (2)-1 are comparative examples. For (2)-1, the calculation was carried out for AH561 without gate open/close control (always open), under the temperature conditions where the resin temperature, the hot runner temperature and the mold temperature were 220° C., 220° C., and 50° C. respectively, or alternatively where the resin temperature, the hot runner temperature and the mold temperature were 240° C., 240° C., and 50° C. respectively. As for (1), the calculation was carried out for AZ564 (a high flow resin, MFR=30) shown in Table 1 without gate open/close control (always open), under the temperature conditions where the resin temperature, the hot runner temperature and the mold temperature were 200° C., 200° C., and 50° C. respectively, and under the temperature conditions where the resin temperature, the hot runner temperature and the mold temperature were 220° C., 220° C., and 50° C. respectively. The open/close timing of valve gate during the operation is shown.

ness shall be minimized as far as possible within the range that the mold clamping force satisfies the predetermined constraint condition. Here, the constraint condition of the mold clamping force was determined to be 800 tons including the safety factor, when the mold clamping capacity of the injection molding device was 1000 ton.

Figure 8:
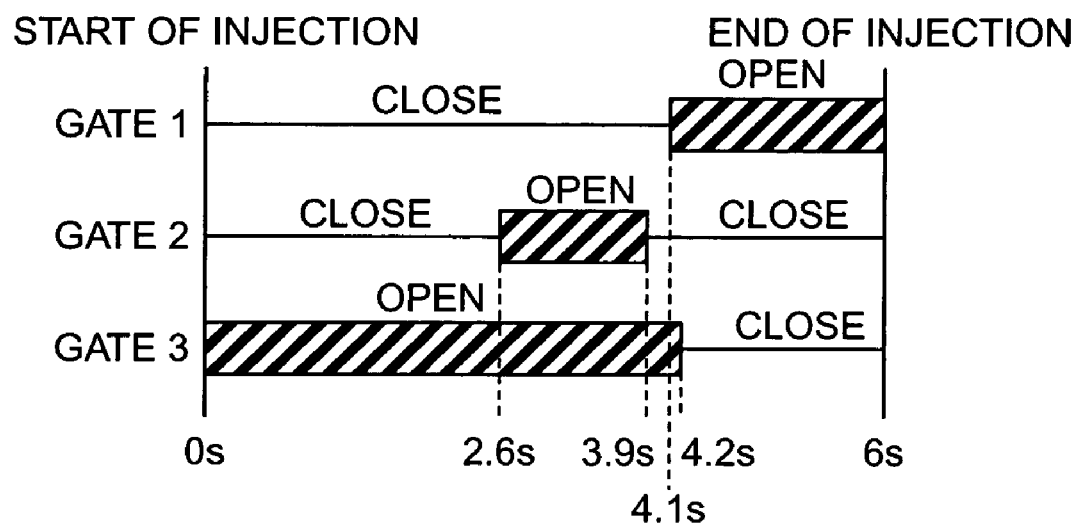
FIG. 8 shows a gate operation pattern established in one embodiment of the method for determining the process parameter of an injection molding according to the present invention.

The result is shown in Table 3. FIG. 8 shows the open/close timing in this case. As shown in FIG. 8, the gate 1 is kept closed from the start of injection to a time of 4.1 seconds, and is kept opened from the time of 4.1 seconds to the end of injection. The gate 2 is kept closed from the start of injection to a time of 2.6 seconds, and is kept opened from the time of 2.6 seconds to a time of 3.9 seconds, then is kept closed from the time of 3.9 seconds to the end of injection. The gate 3 is kept opened from the start of injection to a time of 4.2 seconds, and is kept closed from the time of 4.2 seconds to the end of injection. With the combination of open/close operations of gates as described above, it was found that, as shown in Table 3, low flow resin can be molded with the thickness as small as about 1.9 mm under the above-described conditions. Accordingly, it is verified that according to the present inven-

TABLE 2

| Condition | Thickness mm | Material | Mold clamping force without gate open/close control (all gates always kept opened) (ton) | | | Gate open/close control | | | Mold clamping force with gate open/close control (ton) |
|---|---|---|---|---|---|---|---|---|---|
| | | | 200° C. | 220° C. | 240° C. | G1 | G2 | G3 | 220° C. |
| (1) | 3.0 | AZ564 (MFR = 30) | 1010 | 840 | | ○ | ○ | ○ | |
| (2)-1 | 3.0 | AH561 (MFR = 3) | | 1630 | 1470 | ○ | ○ | ○ | |
| (2)-2 | 3.0 | AH561 (MFR = 3) | | | | 3.4-END | 0.8-2.7 | 0-4.9 | 320 |
| (3) | 2.5 | AH561 (MFR = 3) | | | | 0-5.4 | 1.7-3.5 | 2.7-END | 470 |

(9) Selection of Material

According to Table 2, the high flow resin of preliminary design (1) can be molded with a mold clamping force of 1000 ton or smaller even without a gate operation when the temperature of the resin is 220° C. and the temperature of the hot runner is 220° C. Meanwhile, the low flow resin of case (2) cannot be molded with a mold clamping force of 1000 ton or smaller even when both the temperature of the resin and the temperature of the hot runner are raised to 240° C. However, with a valve gate operation, even the low flow resin of case (2) can be molded with a mold clamping force of 500 ton or smaller. As a result, for a product for which AH561 is more suitable than AZ564 as resin material, the preliminary design (2) can be adopted as the final design. With a valve gate operation, even in the case of the preliminary design (3) molding can be conducted at a mold clamping force of 500 ton or smaller. Therefore, when the thickness of the product can be reduced owing to the strength or other conditions of the low flow resin AH561, the preliminary design (3) may be adopted as the final design.

(10) Adjustment of Dimensions

Furthermore, in the case where AH561 is preferable as the resin material, optimization was carried out for determining how far the thickness of the product could be reduced under the restriction on mold clamping force. The optimization process was basically similar with the case explained in FIG. 3. The objective function, however, is determined as the thicktion, an optimum product design can be selected within constraints such as actual molding device, through the investigation of mold clamping force for the options of wider preliminary designs than ever.

TABLE 3

| Thickness [mm] | Material | Gate opening timing[s] injection start = 0 | | | Mold clamping force [ton] | |
|---|---|---|---|---|---|---|
| | | G1 | G2 | G3 | Constraint condition | Results |
| 1.9 | AH561 (MFR = 3) | 4.1-END | 2.6-3.9 | 0-4.2 | ≦800 | 780 |

In the above-described embodiment, the mold clamping force is determined by the optimization method, followed by the resin material selection and then the thickness of the product is established. However when the resin material is given, the product thickness may directly be specified as a variable parameter and determined through the optimization method directly. Furthermore, although the embodiment concerned the design of a plate-shaped product with a uniform thickness, the thickness distribution may be aimed to determine for a product with non-uniform thickness.

As described above, according to the present invention, an optimum mold clamping force required can be calculated through the determination of the mold clamping force required for injection molding by means of the computer-aided optimization method. Accordingly, even for producing a resin product having an arbitrary shape by injection molding, an optimum resin product design can be achieved comparing the mold clamping forces among wider options with the capacity of available injection molding devices.

What is claimed is:

1. A method for obtaining resin product design parameters for use in an event of designing a resin product to be molded by injection molding, the method comprising the steps of:
    obtaining a mold clamping force required for conducting injection molding of a resin product having a specified shape using a computer-aided optimization method; and obtaining the design of said resin product based on the thus obtained mold clamping force, and
    in which a process parameter for determining an inflow of a resin material from a plurality of resin inflow conduits connecting with a cavity is used as a variable parameter for determining said mold clamping force,
    wherein said process parameter is a parameter which controls actions of valve gates located at said plurality of resin inflow conduits, and
    wherein resin product design parameters are optimized under the condition where at least one of the valve gates is selected as a timing regulation gate that is restricted by the action of other gates, in order that at least one valve gate is kept open at any given time during filling stage.

2. The method for obtaining resin product design parameters according to claim 1, wherein said valve gate is controlled by choosing either full opening or full closing.

3. The method for obtaining resin product design parameters according to claim 1, wherein resin material for molding is thermoplastic resin.

4. The method for obtaining resin product design parameters according to claim 1, wherein resin material for molding is polypropylene-base resin.

5. The method for obtaining resin product design parameters according to claim 1, wherein resin material for molding is low flow resin.

6. The method for obtaining resin product design parameters according to claim 1, wherein the material of the product is determined based on the mold clamping force determined by an optimization method.

7. The method for obtaining resin product design parameters according to claim 1, wherein the thickness distribution of the product is determined based on the mold clamping force determined by an optimization method.

8. The method for obtaining resin product design parameters according to claim 1, wherein the thickness distribution of the product is determined by an optimization method under constraint conditions for the mold clamping force.

9. A method for producing a resin product, comprising molding a resin product in an injection molding process so as to produce a resin product that satisfies resin product design parameters obtained from the method according to claim 1.

10. An injection molding device comprising:
    a molding device main body which feeds a molten resin to a mold having a plurality of resin inflow conduits to a cavity therethrough;
    a memory section which memorizes molding parameters determined by a computer-aided optimization method such that a resin product that satisfies resin product design parameters obtained from the method according to claim 1 can be produced; and
    a control section which conducts injection molding while controlling said molding device main body based on said resin design parameters.

* * * * *